(12) United States Patent
Moyer

(10) Patent No.: US 11,976,226 B2
(45) Date of Patent: May 7, 2024

(54) METHODS OF FORMING UNCURED SEALANT ASSEMBLIES AND USING SUCH ASSEMBLIES FOR SEALING AND BONDING PARTS

(71) Applicant: The Boeing Company, Chicago, IL (US)

(72) Inventor: Eric K. Moyer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 17/652,048

(22) Filed: Feb. 22, 2022

(65) Prior Publication Data
US 2022/0325142 A1    Oct. 13, 2022

Related U.S. Application Data

(60) Provisional application No. 63/173,910, filed on Apr. 12, 2021.

(51) Int. Cl.
*C09J 7/35* (2018.01)
*B29C 65/48* (2006.01)
(Continued)

(52) U.S. Cl.
CPC ...... *C09J 7/35* (2018.01); *B64C 7/00* (2013.01); *C09J 5/06* (2013.01); *C09J 7/10* (2018.01); *C09J 7/401* (2018.01); *B29C 65/485* (2013.01); *B32B 37/12* (2013.01); *B32B 37/1207* (2013.01); *B32B 38/0004* (2013.01); *B32B 38/10* (2013.01); *B32B 2605/18* (2013.01); *C09J 2203/35* (2020.08); *C09J 2427/005* (2013.01);
(Continued)

(58) Field of Classification Search
CPC ............... B32B 37/12; B32B 37/1207; B32B 2037/1269; B32B 2605/18; B29C 65/485; B29L 2031/3076; B29L 2031/3082; B29L 2031/3085
See application file for complete search history.

(56) References Cited

U.S. PATENT DOCUMENTS 10,875,256 B2    12/2020    Forston et al.
2005/0148741 A1    7/2005    Zook et al.

FOREIGN PATENT DOCUMENTS

EP    2 843 020 A1    3/2015
EP    3 546 200 A1    10/2019

OTHER PUBLICATIONS

Extended European Search Report and Written Opinion issued for EP 22 15 1522, dated Jul. 7, 2022, pp. 1-14.

*Primary Examiner* — Carson Gross
(74) *Attorney, Agent, or Firm* — Bell & Manning, LLC

(57) ABSTRACT

Described herein are methods of forming uncured sealant assemblies and also methods of forming seals between various parts using such assemblies. In some examples, an uncured sealant assembly comprises two protective layers and an uncured sealant layer, disposed in between. The uncured sealant assembly is stored and provided at a cure-inhibiting temperature, selected to minimize the curing rate of the uncured sealant layer. The size and the shape of the uncured sealant layer are specifically selected to ensure the complete coverage of the faying surfaces, filling of all gaps and voids between the faying surfaces, and controlling the shape and size of uncured sealant squeeze out between the faying surfaces. In some examples, the size and shape of the uncured sealant layer maybe be specifically selected to have no uncured sealant squeeze out between parts.

11 Claims, 11 Drawing Sheets

(51) Int. Cl.
- *B32B 37/12* (2006.01)
- *B32B 38/00* (2006.01)
- *B32B 38/10* (2006.01)
- *B64C 7/00* (2006.01)
- *C09J 5/06* (2006.01)
- *C09J 7/10* (2018.01)
- *C09J 7/40* (2018.01)

(52) U.S. Cl.
CPC ........ *C09J 2481/00* (2013.01); *C09J 2483/00* (2013.01); *C09J 2483/005* (2013.01)

METHODS OF FORMING UNCURED SEALANT ASSEMBLIES AND USING SUCH ASSEMBLIES FOR SEALING AND BONDING PARTS

CROSS-REFERENCE TO RELATED APPLICATIONS

This application claims the benefit under 35 U.S.C. § 119(e) of U.S. Provisional Patent Application 63/173,910, filed on 2021 Apr. 12, which is incorporated herein by reference in its entirety for all purposes.

BACKGROUND

Sealants are used for many applications such as aircraft, spacecraft, water-based vehicles, ground-based vehicles, and the like. Yet, conventional sealants and uncured sealant application methods provide very limited control of the uncured sealant amount and uncured sealant distribution between faying surfaces. For example, an excess amount of uncured sealant is typically applied on faying surfaces to ensure the complete coverage of the faying surfaces and fill any gaps between these faying surfaces. Mating two or more faying surfaces typically causes some sealant to be squeezed out of the assembled part(s). This sealant excess, which is not part of the final seal definition, is then removed or faired depending on the exact final seal definition. Not only are large amounts of uncured sealant wasted in this conventional process, but also this process requires additional efforts to remove all of the excess sealant from the final assembly (e.g., before or after the sealant is cured). At the same time, faying surfaces can be very complex and difficult to reach, which complicates both the proper uncured sealant application and the removal of excess sealant.

What is needed are new sealing methods and sealing components.

SUMMARY

Described herein are methods of forming uncured sealant assemblies and also methods of forming seals between various parts using such assemblies. In some examples, an uncured sealant assembly comprises two protective layers and an uncured sealant layer, disposed in between. The uncured sealant assembly is stored and provided at a cure-inhibiting temperature, selected to minimize the curing rate of the uncured sealant layer. The size and the shape of the uncured sealant layer are specifically selected to ensure the complete coverage of the faying surfaces, filling of all gaps and voids between the faying surfaces, and controlling the shape and size of uncured sealant squeeze out between the faying surfaces. In some examples, the size and shape of the uncured sealant layer maybe be specifically selected to have no uncured sealant squeeze out between parts.

DETAILED DESCRIPTION

Figure 1:
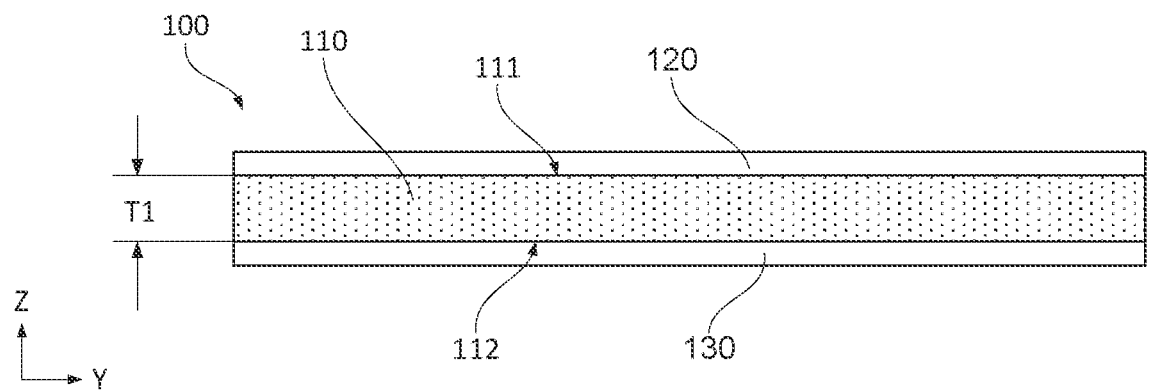
FIG. 1 is a schematic illustration of an uncured sealant assembly, comprising a first protective layer, a second protective layer, and an uncured sealant layer, disposed between these protective layers, in accordance with some examples.

In the following description, numerous specific details are outlined to provide a thorough understanding of the presented concepts. In some examples, the presented concepts are practiced without some or all of these specific details. In other examples, well-known process operations have not been described in detail to unnecessarily obscure the described concepts. While some concepts will be described in conjunction with the specific examples, it will be understood that these examples are not intended to be limiting.

Introduction

Sealing or bonding two or more faying surfaces typically involves placing a seal between the surfaces. Seals provide various benefits over direct-contact/seal-less interfaces, such as less restrictive tolerances of the faying surfaces and allowance for thermal expansion/mechanical movements. For adequate sealing or bonding, a seal needs to fill the gap(s) between the faying surfaces, which can be challenging in some instances using traditional methods. For example, applying an uncured sealant to non-planar surfaces and/or non-parallel surfaces may require different uncured sealant amounts at different locations of a single faying surface interface. Furthermore, correctly distributing uncured sealant within the faying surface interface can be challenging. Overall, complex shapes of the faying surfaces and restricted access to these faying surfaces may cause non-conformance in the final seal shape.

One conventional approach to forming a seal is to apply excess amounts of uncured sealant in the faying surface interface area and rely on the distribution and displacement of the uncured sealant when the faying surfaces are brought together into their final assembled position. In some examples, the excess amounts are significant because of the manual distribution of uncured sealant. Furthermore, predicting the exact position of the final seal location and the exact amount of the sealing material needed for this seal is challenging, especially for complex shapes of the faying surfaces. Finally, the excess amounts of the sealing material, which are displaced away from the sealing interface, cause material waste and require clean-up.

Described herein are uncured sealant assemblies, methods of forming these uncured sealant assemblies, and also methods of forming seals between various parts using these uncured sealant assemblies. The size and shape (e.g., the volume and, more specifically, the volume distribution) of the uncured sealant layers in these assemblies are specifically designed for corresponding sealing interfaces. In some examples, uncured sealant assemblies can change at least the width of the uncured sealant layer before the installation, e.g., by cutting the uncured sealant assemblies to their final size. In some examples, uncured sealant assemblies allow using multicomponent sealing materials for uncured sealant layers as further described below.

For purposes of this disclosure, the term "uncured sealant layer" refers to a structure of an uncured sealant assembly, before being fully cured. Once this structure is fully cured, this structure is referred to as a "seal." The seal is positioned between two or more parts to inhibit/prevent the transportation of a fluid (e.g., air, water, fuel, oil, and the like) through or into the faying surface of these two or more parts. The term "function seal" and "seal" are used interchangeably.

An uncured sealant layer has a specific shape, size, and/or volume before positioning between two or more parts. Once positioned between the parts and the parts are aligned into the final position, the uncured sealant layer is distributed on the faying surfaces of these parts (e.g., per engineering requirements). The uncured sealant layer also fills the intended gaps/voids between these faying surfaces (e.g., per engineering requirements). Furthermore, in some examples, the uncured sealant layer is squeezed out from the gap between these parts (e.g., per engineering requirements).

The terms "sealing" and "bonding" are used interchangeably. In some examples, a seal, formed between two parts by curing the uncured sealant layer, provides structural support between the parts, e.g., using the adhesive strength of the seal. For example, the seal is used for bonding a non-critical bracket to the main structure in an aircraft (e.g., an airplane, or a helicopter).

In some examples, an uncured sealant assembly comprises two protective layers and an uncured sealant layer, disposed between these protective layers. The two protective layers are removed during the installation of the uncured sealant assembly. The uncured sealant layer is used to form a seal/bond, e.g., by curing the uncured sealant layer after being positioned between the two parts and when the parts are aligned relative to each other into the final position. The shape and size (e.g., volume and the distribution of this volume) of the uncured sealant layer are specifically selected based on the faying surfaces of these parts. In some examples, the width of the uncured sealant layer varies along the length (e.g., to form the seal with the varying width). In the same or other examples, the thickness of the uncured sealant layer varies along the length and/or along the width (e.g., to form the seal with the varying thickness). Furthermore, in some examples, both the width and the thickness of the uncured sealant layer vary along the length.

The uncured sealant assembly is stored and provided at a cure-inhibiting temperature, selected to minimize the curing rate of the uncured sealant layer, at least before the installation of this layer between the parts. In some examples, the cure-inhibiting temperature is less than the room temperature or, more specifically, less than +5° C. or even less than −5° C. Storing the uncured sealant assembly at the cure-inhibiting temperature allows using multicomponent sealing materials for the uncured sealant layer of this assembly. For example, multiple components may be mixed. The mixture is then deposited on one of the protective layers, e.g., controlling the thickness and/or the width of this deposit. In some examples, the thickness and/or the width are varied at the time of the deposition. This deposit forms an uncured sealant layer. The deposit may be cooled during the deposition and/or after the deposition. Besides inhibiting the curing rate of the uncured sealant layer, the cure-inhibiting temperature can also help with maintaining the size and shape of the layer. For example, before curing, the viscosity of many sealing materials increases as these materials are cooled. At a higher viscosity, the uncured sealant layer is more capable of maintaining its shape and size during subsequent processing, storage, and handling. It should be noted that when the uncured sealant layer is installed, the temperature of the uncured sealant layer is increased thereby reducing the viscosity and allowing distribution of the uncured sealant layer within the gap between the two parts. Furthermore, a higher temperature increases the curing rate to form the seal from the uncured sealant layer.

FIG. 1 is a schematic cross-sectional view of uncured sealant assembly 100, in accordance with some examples. Uncured sealant assembly 100 comprises first protective layer 120, second protective layer 130, and uncured sealant layer 110 disposed between first protective layer 120 and second protective layer 130. In some examples, uncured sealant layer 110 is formed from a multi-components sealing material, various examples of which are described below. The curing rate of uncured sealant layer 110 is controlled by the temperature. For example, uncured sealant assembly 100 is stored and provided at a cure-inhibiting temperature, specifically selected based on the composition of uncured sealant layer 110. As noted above, the shape and size of uncured sealant layer 110 are selected based on a specific sealing interface, for which this uncured sealant assembly 100 is specifically designed.

First protective layer 120 and second protective layer 130 enclose uncured sealant layer 110 and prevent the surfaces of uncured sealant layer 110 from being contaminated, e.g., while storing and handling uncured sealant assembly 100. Specifically, first protective layer 120 directly interfaces and protects first sealant surface 111 of uncured sealant layer 110. Second protective layer 130 directly interfaces and protects second sealant surface 112 of uncured sealant layer 110. Second sealant surface 112 is opposite of first sealant surface 111. Collectively, first sealant surface 111 and second sealant surface 112 define the thickness (identified as T1 in FIG. 1 and extending along the Z-axis).

First protective layer 120 and second protective layer 130 are removed from uncured sealant layer 110 during the installation of uncured sealant layer 110 between two parts. As such, first sealant surface 111 can directly contact one part, while second sealant surface 112 can directly contact another part as further described below.

Various applications of uncured sealant assembly 100 are within the scope. Uncured sealant assembly 100 is particularly useful for aerospace structures, in which the integrity of the seals is particularly important. Some specific examples include, but are not limited to, the fluid sealing (air pressure) of an airplane fuselage aft pressure bulkhead to a fuselage skin, the fluid sealing (air pressure) of an airplane fuselage aft wheel well bulkhead to a fuselage skin, the fluid sealing (fuel) of airplane wing ribs to a wing skin to form a wing fuel tank, the fluid sealing (fuel) of airplane wing spars to a wing skin to form a wing fuel tank, the corrosion protection of airplane/helicopter fuselage frame components to a fuselage skin, the corrosion protection of airplane/helicopter fuselage longerons/stringers to a fuselage skin, the corrosion protection of airplane/helicopter brackets to primary structural elements, the corrosion protection of airplane/helicopter component to primary structural elements, and the like. Additional examples are described below with reference to FIGS. 8 and 9.

Examples for Forming Seals

Figure 2:
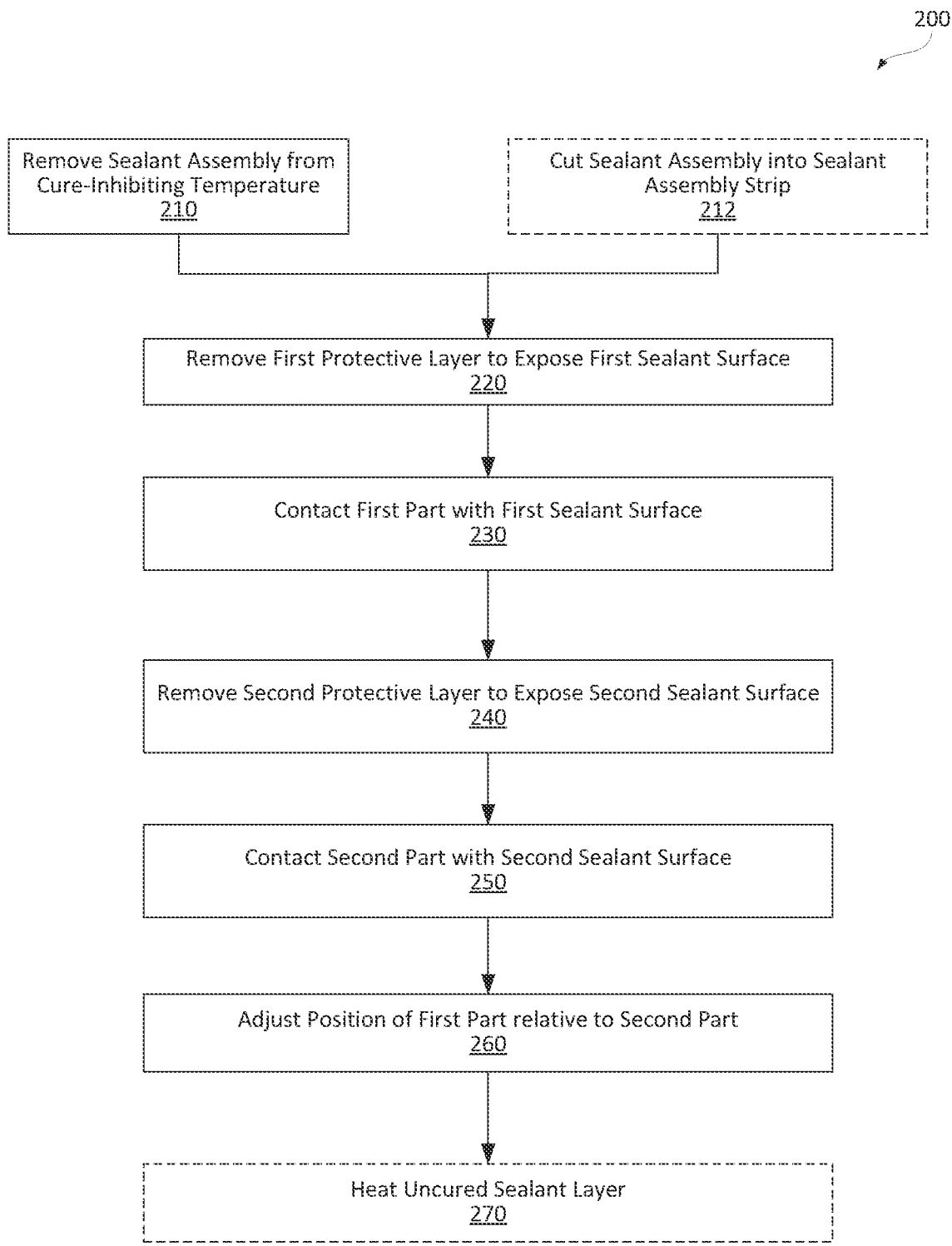
FIG. 2 is a process flowchart corresponding to a method of forming a seal between two parts using an uncured sealant assembly, in accordance with some examples.

FIG. 2 is a process flowchart corresponding to method 200 of forming seal 170 between first part 180 and second part 190 using uncured sealant assembly 100, in accordance with some examples. Some examples of uncured sealant assembly 100 are described above with reference to FIG. 1. Examples of first part 180 and second part 190 below with reference to FIGS. 4B-4F as well as FIGS. 5A-5E. Other examples are also within the scope. As noted above, uncured sealant assembly 100 comprises first protective layer 120, second protective layer 130, and uncured sealant layer 110, disposed between first protective layer 120 and second protective layer 130.

In some examples, method 200 comprises (block 210) removing uncured sealant assembly 100 from a cure-inhibiting temperature. The cure-inhibiting temperature is selected to reduce the curing rate of uncured sealant layer 110. The cure-inhibiting temperature generally depends on the composition of uncured sealant layer 110. In some examples, the cure-inhibiting temperature is below the room temperature (e.g., between 20-25° C.). More specifically, the cure-inhibiting temperature is less than +5° C. or, more specifically, less than −5° C. In more specific examples, the cure-inhibiting temperature is between −10° C. and +10° C. or between −5° C. and +5° C. In these examples, the room temperature may be used as a curing temperature, thereby eliminating the need for additional heating. Alternatively, uncured sealant layer 110 is heated above the room temperature for curing as further described below.

Figure 3:
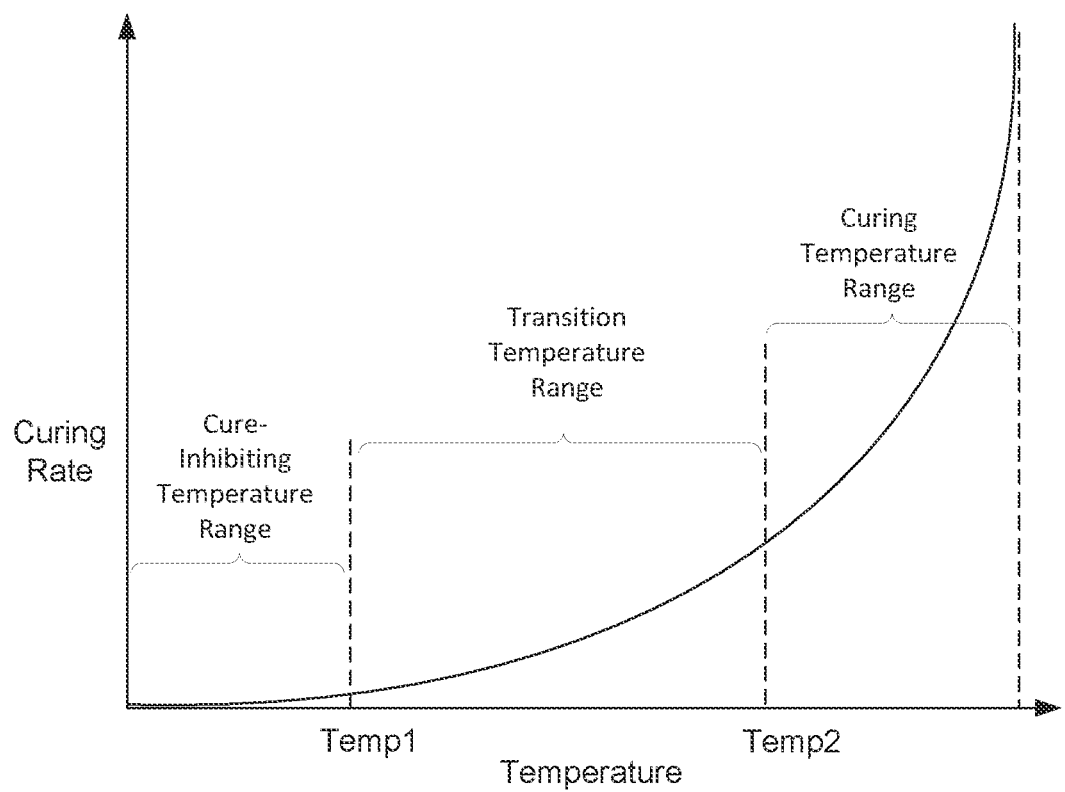
FIG. 3 is an illustrative plot of the curing rate of an uncured sealant layer as a function of the temperature.

Storing uncured sealant assembly 100 at the cure-inhibiting temperature allows using various materials for uncured sealant layer 110, such as multi-component mixtures. It should be noted that some insignificant curing can occur even at the cure-inhibiting temperature. FIG. 3 is an illustrative profile of a curing rate as a function of the temperature. One having ordinary skill in the art would recognize that the curing rate is highly dependent on the temperature (e.g., exponentially dependent). For simplicity, the overall temperature range is divided into a cure-inhibiting temperature range (at or below Temp1), a curing temperature range (at or above Temp2), and a transition temperature range (between Temp 1 and Temp2). Within the cure-inhibiting temperature range, the curing rate is negligible, and uncured sealant assembly 100 can be stored for significant periods (e.g., for 7-21 days—depending on the temperature and the composition). Within the curing temperature range, the curing rate is significant, allowing to form seal 170 within a reasonable amount of time. Some processing may occur during the transition temperature range. However, this period should be controlled to avoid excessive curing during processing and premature curing of uncured sealant layer 110 before various processing steps are completed. For example, excessing curing may reduce the adhesion and/or redistribution of uncured sealant layer 110 between first part 180 and second part 190.

In some examples, uncured sealant layer 110 comprises a two-component sealant selected from a group consisting of a polysulfide sealant, a silicone sealant, a polythioether sealant, and combinations thereof. Polysulfide sealant and polythioether sealants can be used interchangeably in many areas of aerospace fabrication. For example, polythioether sealants can be used when the sealant needs to be faired for aerodynamic requirements and/or where primer/paint is applied over the sealant on exterior surfaces. Furthermore, polythioether sealants can be used during maintenance/service operations where parts are re-installed or replaced in uncontrolled or extreme temperature/humidity conditions, such as field maintenance/service. Polythioether sealants are used when in low temperature and/or high humidity working conditions. Silicone sealants can endure high-temperature environments and can be used for part installation around engines, auxiliary power units (APU), or anywhere with operating temperatures approaching or exceeding 90° C. The workability (e.g., ability to apply, fair, and clean-up) of silicone sealants is more difficult than polysulfide sealant and polythioether sealants. Silicone sealants are not used where primer/paint is applied over the top of the sealant on exterior surfaces.

In some examples, first protective layer 120 and second protective layer 130 comprises one or more materials selected from the group consisting of polytetrafluoroethylene (PTFE), fluorinated ethylene propylene (FEP), silicone, and combinations thereof. The protective layer materials are selected such that these layers do not form adhesive bonds to uncured sealant layer 110, e.g., while uncured sealant assembly 100 is stored. In some examples, the thickness of first protective layer 120 and/or second protective layer 130 is between about 0 and 2 millimeters or, more specifically, between 0.05 millimeters and 0.40 millimeters. First protective layer 120 and second protective layer 130 conform to first sealant surface 111 and second sealant surface 112 as, e.g., is shown in FIG. 1. More specifically, first protective layer 120 and second protective layer 130 protect first sealant surface 111 and second sealant surface 112 from contamination and, more generally, from contacting the environment.

In some examples, method 200 comprises (block 212) cutting uncured sealant assembly 100 along the length to adjust the width of uncured sealant assembly 100. In other words, uncured sealant assembly 100 may be cut into one or more strips, such that at least one of these strips forms a new uncured sealant assembly for use between first part 180 and second part 190. This cutting operation may be performed before removing first protective layer 120 from uncured sealant layer 110 or after removing first protective layer 120.

In some examples, this cutting operation may be performed while uncured sealant assembly 100 remains at the cure-inhibiting temperature. At this temperature, uncured sealant assembly 100 may be a lot more viscous and easier to cut than, e.g., when uncured sealant assembly 100 reaches room temperature.

In some examples, the cutting width is selected based on the gap width formed by first part 180 and second part 190. This tailored approach allows complete filling of this gap with uncured sealant layer 110 and without having any excess of uncured sealant layer 110 that later needs to be removed. As such, no further removal of uncured sealant layer 110 is needed after uncured sealant layer 110 is positioned between first part 180 and second part 190. Furthermore, this cutting operation allows minimizing the number of different types of uncured sealant assemblies. For example, the cutting profile may be selected in the field based on the measurement of the gap that needs sealing.

In some examples, at least one of the protective layers is present during this cutting operation and also cut through during this operation. In more specific examples, both first protective layer 120 and second protective layer 130 are present and are cut during this operation. Alternatively, at least one of the protective layers is removed before cutting.

Method 200 proceeds with (block 220) removing first protective layer 120 from uncured sealant layer 110. This operation exposes first sealant surface 111 of uncured sealant layer 110. For example, first protective layer 120 is peeled away from first sealant surface 111. It should be noted that this operation is performed within a preset period since uncured sealant assembly 100 has been already removed from the cure-inhibiting temperature. This preset time cumulatively applies to all operations of method 200, after removing uncured sealant assembly 100 from the cure-inhibiting temperature and up until the curing operation, if one is present.

Figure 4A:
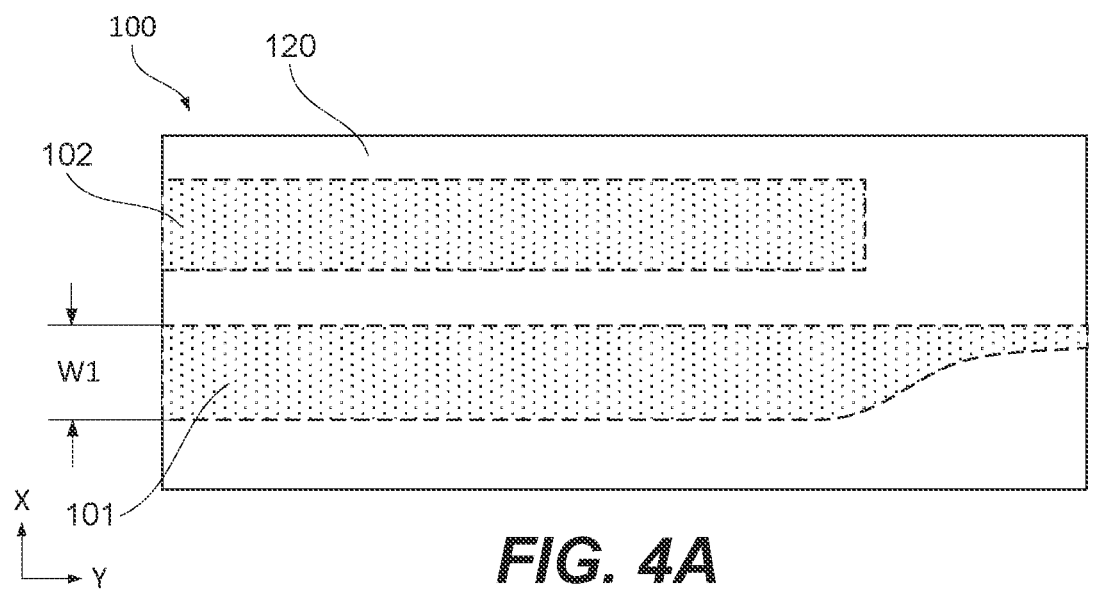
FIG. 4A illustrates an example of an uncured sealant assembly, comprising multiple uncured sealant layers, in accordance with some examples.
Figure 4B:
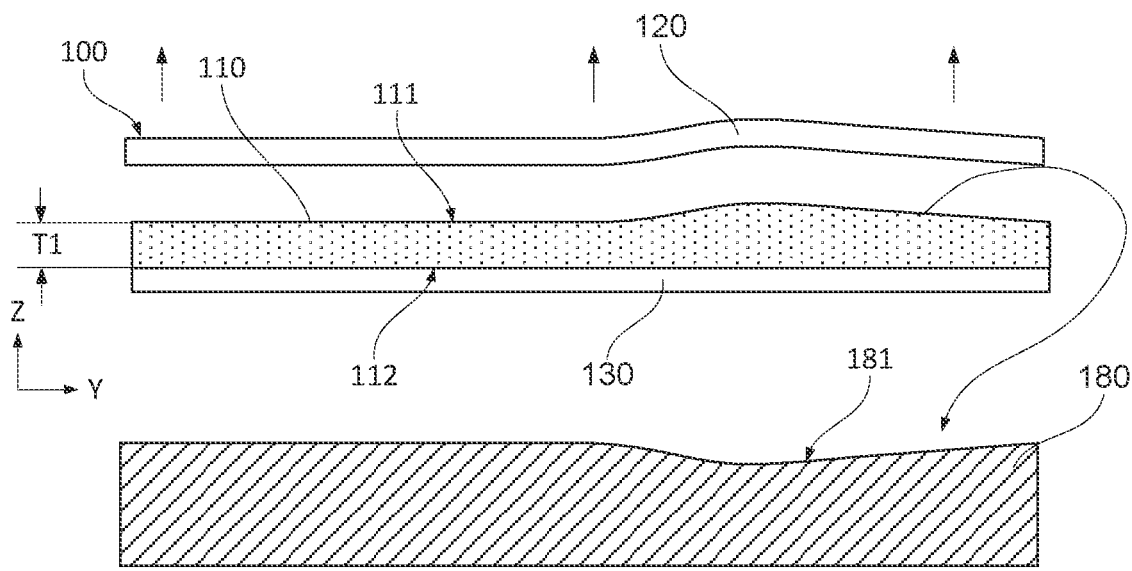
FIG. 4B is a schematic illustration of a processing stage during the removal of the first protective layer from the uncured sealant layer, in accordance with some examples.

At this stage, e.g., before contacting first part 180 with first sealant surface 111, at least one of the thickness or the width of uncured sealant layer 110 varies at least along the length. Referring to FIGS. 4A and 4B, uncured sealant layer 110 has a width (extending along the X-axis), a length (extending along the Y-axis), and a thickness (extending along the Z-axis). In some examples, the width, length, and thickness are specifically selected to ensure that the gap between first part 180 and second part 190 is sufficiently filled and sealed (e.g., without leaving any empty spaces) and without any excess of uncured sealant layer 110 that needs to be removed.

For example, FIG. 4A illustrates an example of uncured sealant assembly 100 comprising first uncured sealant assembly strip 101 and second uncured sealant assembly strip 102. First uncured sealant assembly strip 101 and second uncured sealant assembly strip 102 share first protective layer 120 (visible in the top view of FIG. 4A) and second protective layer 130 (positioned underneath in the top view of FIG. 4A). However, in this example, uncured sealant layer 110 is formed by two portions, each corresponding to a different strip. The boundaries of these portions and corresponding strips are identified with dashed lines in FIG. 4A. Furthermore, in some examples, there is a separation between portions and corresponding strips, e.g., as schematically shown in FIG. 4A.

Referring to FIG. 4A, first uncured sealant assembly strip 101 has a width (identified as W1 and extending along the X-axis) that varies along the length. In the illustrated example, first uncured sealant assembly strip 101 is wider at the left end than at the right end. In general, the width profile of each specific strip in uncured sealant assembly 100 or the entire uncured sealant assembly 100 (e.g., a single-strip uncured sealant assembly) is selected based on the gap width between first part 180 and second part 190.

Referring to FIG. 4B, in some examples, uncured sealant layer 110 has a thickness (identified as T1 and extending along the Z-axis) that varies at least along the length (extending along the Y-axis). Similarly, in some examples, uncured sealant layer 110 has a thickness that varies at least along the width (extending along the X-axis). In some specific examples, uncured sealant layer 110 has a thickness, varying along both the width and the length. It should be noted that, in some examples, the thickness of uncured sealant layer 110 changes (to some degree) when uncured sealant layer 110 is compressed between first part 180 and second part 190. As such, the above references to the thickness of uncured sealant layer 110 are at the stage before contacting first part 180 with first sealant surface 111. However, this change in thickness is relatively small compared to the overall thickness of uncured sealant layer 110

In general, the thickness, length, and width of uncured sealant layer 110 are selected based on the shape of first-part sealed surface 181 of first part 180, contacting first sealant surface 111, based on the shape of second-part sealed surface 191 of second part 190, contacting second sealant surface 112, and also based on the expected position of first-part sealed surface 181 relative to second-part sealed surface 191. This selection of thickness, length, and width ensures that the gap between first-part sealed surface 181 and second-part sealed surface 191 is filed.

Figure 5A:
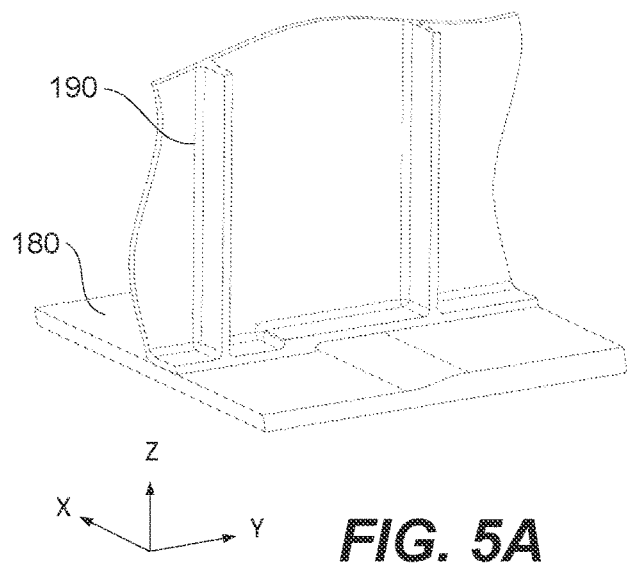
FIGS. 5A and 5B are schematic illustrations of two parts before placing an uncured sealant layer between these parts.
Figure 5B:
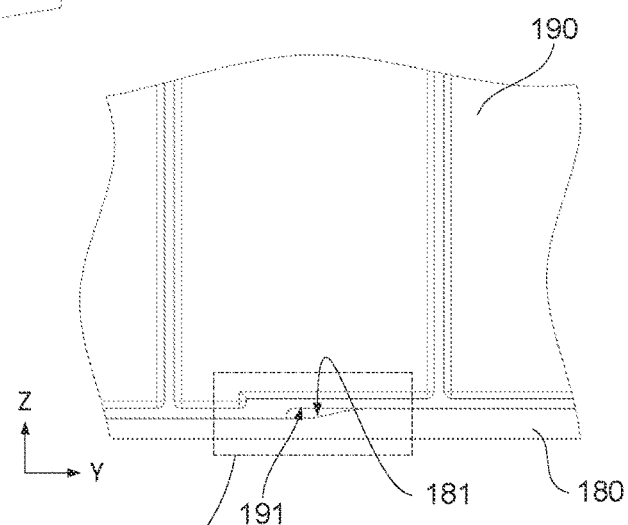
Figure 5C:
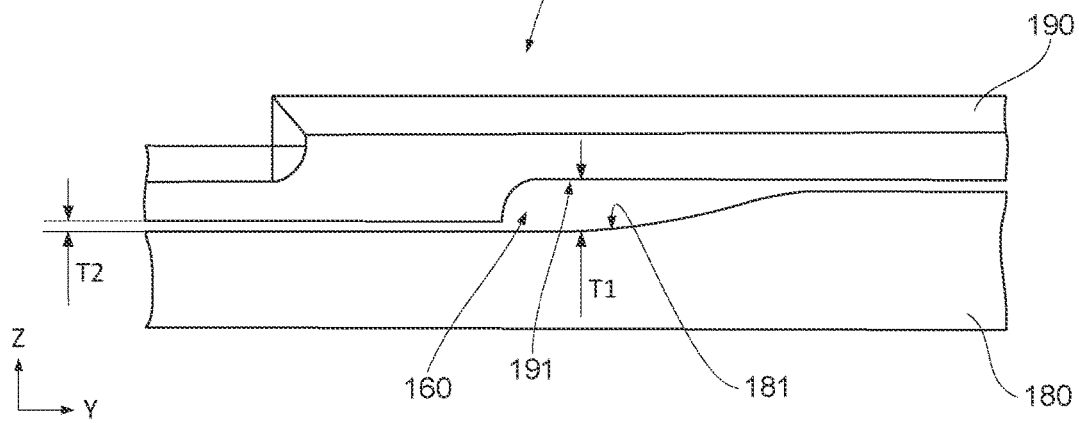
FIG. 5C is a schematic expanded view of a portion of FIG. 5B, illustrating a gap between the two parts.
Figure 5D:
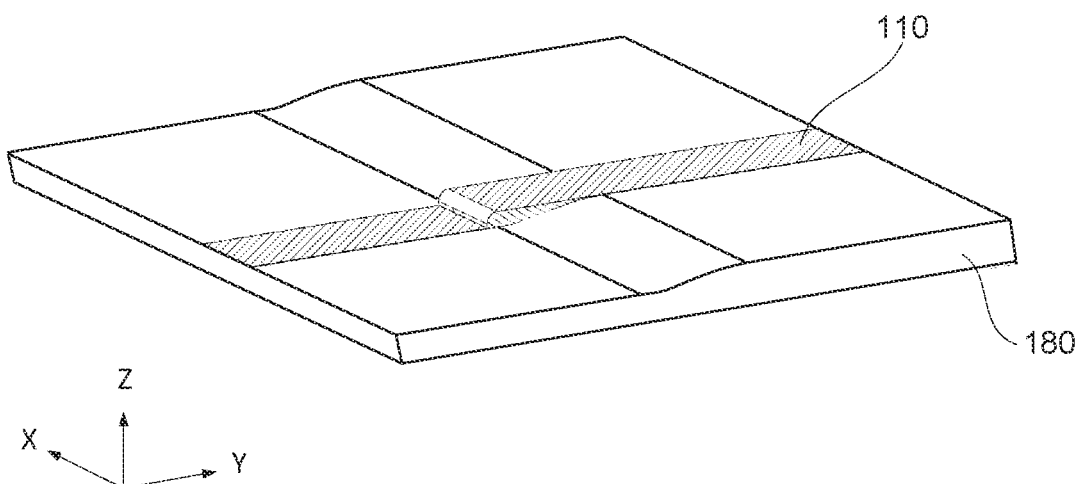
FIGS. 5D and 5E are schematic illustrations of an uncured sealant layer positioned on one of the parts.
Figure 5E:
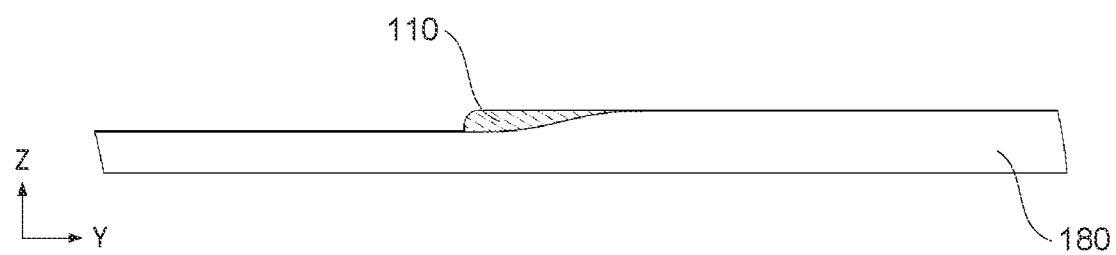
Figure 5F:
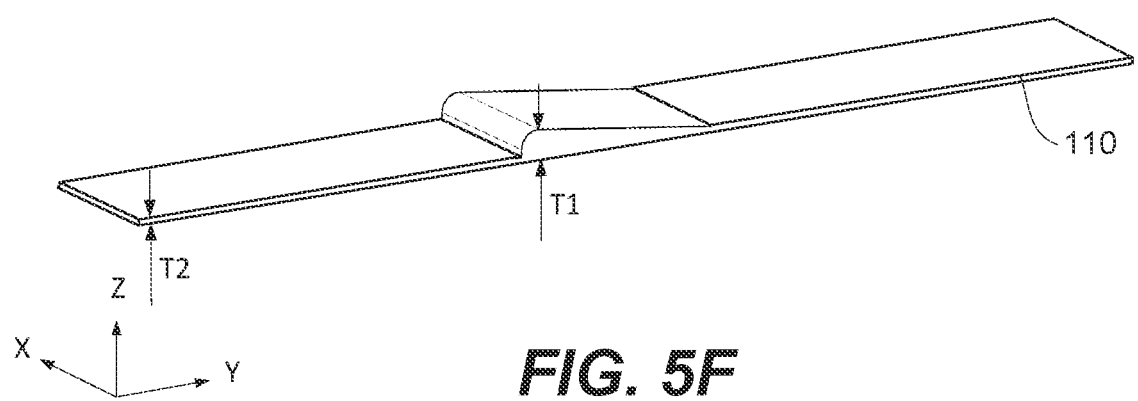
FIG. 5F is a schematic illustration of an uncured sealant layer as a standalone structure.

In some examples, at least one of first-part sealed surface 181 or second-part sealed surface 191 is non-planar as, e.g., is shown in FIGS. 5A, 5B, and 5C. Specifically, FIGS. 5A, 5B, and 5C illustrate an example of first part 180 and second part 190 before placing uncured sealant layer 110 between these parts. In this example, both first-part sealed surface 181 and second-part sealed surface 191 are non-planar. Furthermore, first-part sealed surface 181 and second-part sealed surface 191 form gap 160, which has a variable thickness (e.g., T1>T2 as shown in FIG. 5C). This variable thickness requires a different amount/thickness of uncured sealant layer 110 at different locations in gap 160. The thickness variation of uncured sealant layer 110 is shown in FIGS. 5D, 5E, and 5F. Specifically, FIGS. 5D and 5E illustrate first part 180 with uncured sealant layer 110, placed on and covering first-part sealed surface 181. FIG. 5F illustrates uncured sealant layer 110 as a standalone structure, illustrating thickness variations along the length (the Y-axis) of uncured sealant layer 110. This thickness variation is specifically selected based on the profile of gap 160.

Figure 4C:
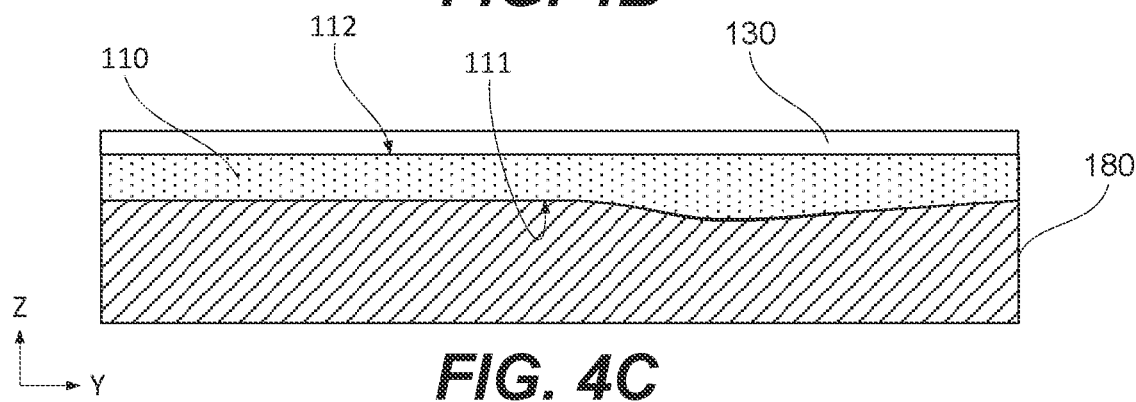
FIG. 4C is a schematic illustration of another processing stage after applying the uncured sealant layer to the first part, in accordance with some examples.

Returning to FIG. 2, method 200 proceeds with (block 230) contacting first part 180 with first sealant surface 111 as, e.g., is schematically shown in FIG. 4C. For example, the assembly comprising uncured sealant layer 110 and second protective layer 130 is aligned relative to first sealant surface 111 and then presses against first sealant surface 111. It should be noted that the bond with first sealant surface 111 is not fully formed at this stage. The bond continues to form as uncured sealant layer 110 cures.

In some examples, the temperature of uncured sealant layer 110 increases after uncured sealant assembly 100 has been removed from the cure-inhibiting temperature. For example, the temperature of the environment, in which various operations of method 200 are performed, is higher than the cure-inhibiting temperature, resulting in some heating of uncured sealant layer 110. In more specific examples, when first part 180 is contacted with first sealant surface 111, the temperature of uncured sealant layer 110 is between 5° C. and 25° C. A higher temperature (than the cure-inhibiting temperature) ensures, for example, that uncured sealant layer 110 can be reshaped and, in some example, redistributed such that first sealant surface 111 fully conforms to first part 180. In other words, some shaping of uncured sealant layer 110 can be performed during this operation.

Figure 4D:
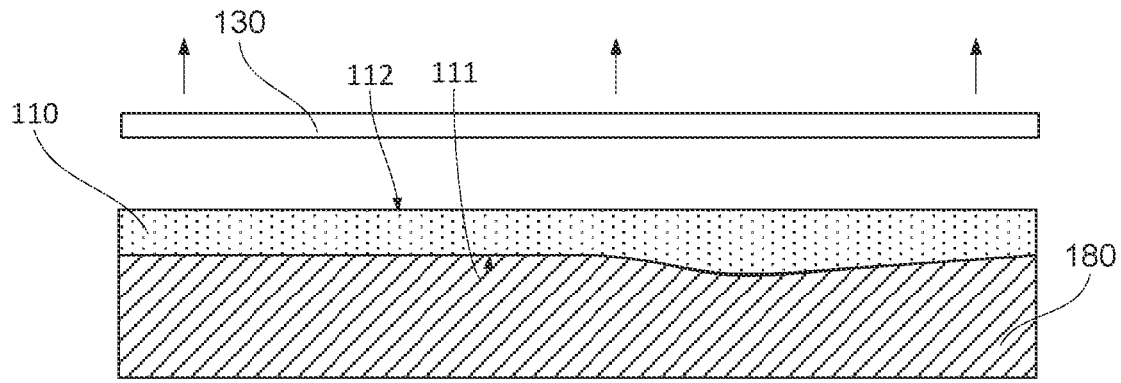
FIG. 4D is a schematic illustration of a processing stage during the removal of the second protective layer from the uncured sealant layer, while the uncured sealant layer is disposed on the first part, in accordance with some examples.

Method 200 proceeds with (block 240) removing second protective layer 130 from uncured sealant layer 110 thereby exposing second sealant surface 112 of uncured sealant layer 110, opposite to first sealant surface 111. This operation is performed while uncured sealant layer 110 is already positioned on first part 180. Specifically, first part 180 acts as a support to uncured sealant layer 110 while second protective layer 130 is removed. Overall, this operation exposes second sealant surface 112 as, e.g., is shown in FIG. 4D. At this stage, uncured sealant layer 110 is ready to contact second part 190.

Figure 4E:
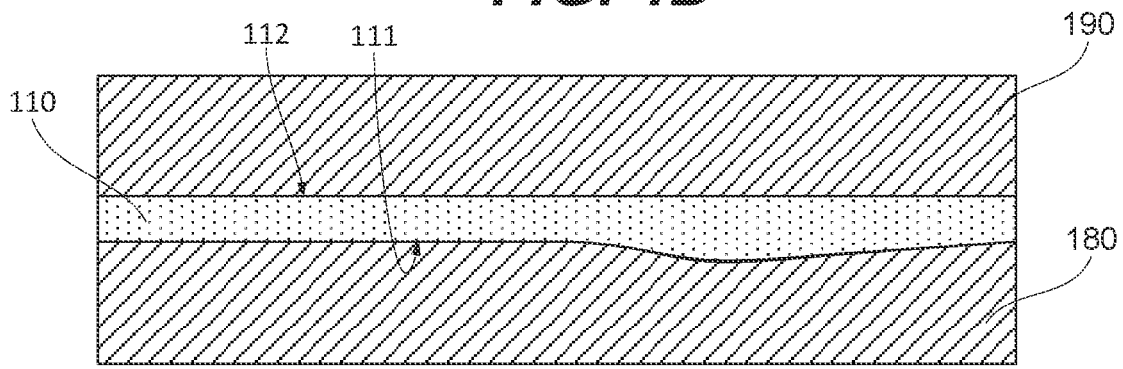
FIG. 4E is a schematic illustration of yet another processing stage after positioning the second part in contact with the uncured sealant layer such that the uncured sealant layer is disposed between and contacts both the first part and the second part, in accordance with some examples.
Figure 4F:
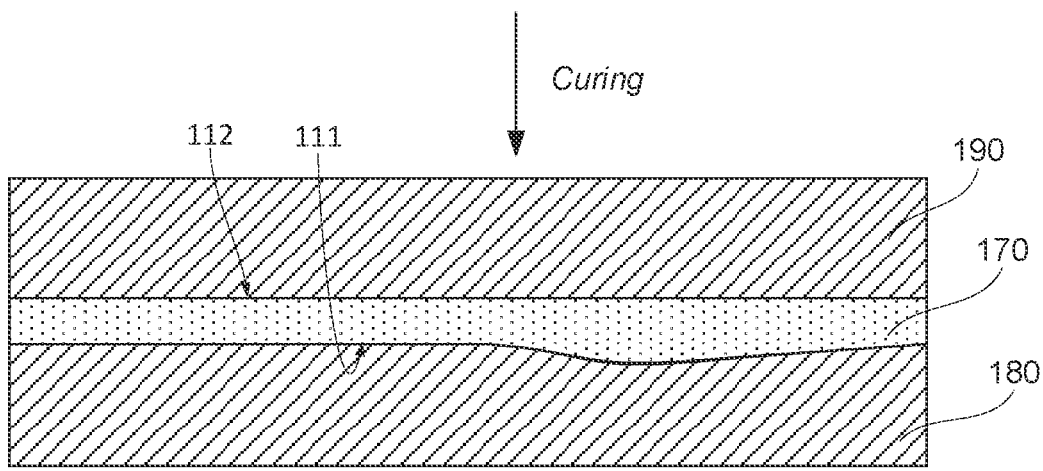
FIG. 4F is a schematic illustration of a processing stage after curing the sealant layer and forming the seal between and contacts both the first part and the second part, in accordance with some examples.

Method 200 proceeds with (block 250) with contacting second part 190 with second sealant surface 112 such that uncured sealant layer 110 is disposed between first part 180 and second part 190. At this stage, uncured sealant layer 110 contacts both first part 180 and second part 190 as, e.g., is schematically shown in FIG. 4E.

In some examples, after uncured sealant layer 110 is positioned between first part 180 and second part 190 or, more specifically, when uncured sealant layer 110 contacts first-part sealed surface 181 and second-part sealed surface 191, uncured sealant layer 110 occupies the gap between first-part sealed surface 181 or second-part sealed surface 191 without extending outside this gap. As such, there are no excesses of uncured sealant layer 110 that need to be removed, which saves time and materials in comparison to conventional processes. As noted above, this feature is achieved by a specific selection of at least the thickness and the width of uncured sealant layer 110, before positioning uncured sealant layer 110 between first part 180 and second part 190.

In some examples, method 200 further comprises (block 260) adjusting the position of first part 180 relative to second part 190 to distribute uncured sealant layer 110 within the space between first part 180 and second part 190. This operation is performed after contacting second part 190 with second sealant surface 112 and before uncured sealant layer 110 is cured into seal 170. The distribution of uncured sealant layer 110 ensures that any gap between first-part sealed surface 181 and second-part sealed surface 191 is filled.

Figure 5G:
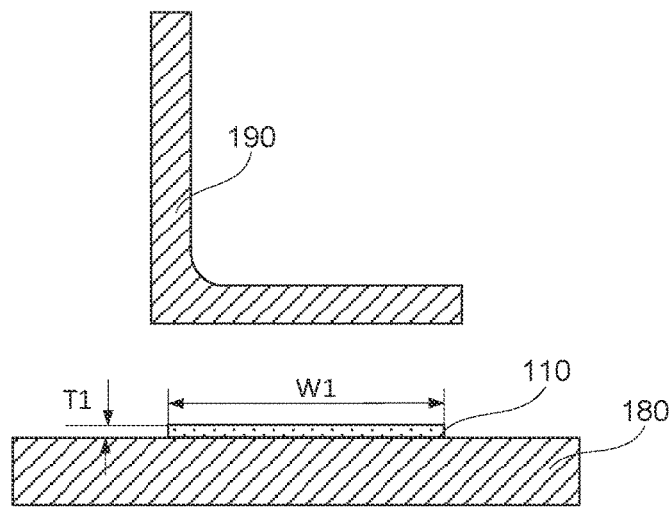
FIGS. 5G and 5H are schematic illustrations of two parts and an uncured sealant layer at different stages during the positioning of these parts.
Figure 5H:
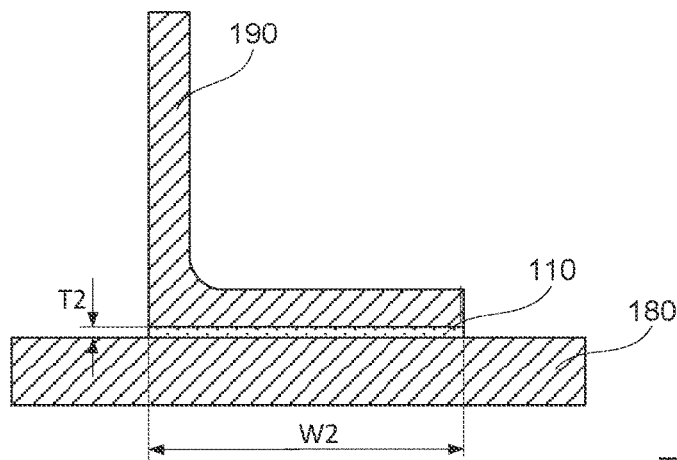

FIGS. 5G and 5H are schematic illustrations of two different stages while adjusting the position of first part 180 relative to second part 190. More specifically, FIGS. 5G and 5H illustrate redistribution of uncured sealant layer 110 between first part 180 and second part 190. In some examples, the thickness of uncured sealant layer 110 before being contacted by both first part 180 and second part 190 is greater than after uncured sealant layer 110 is in contact with both first part 180 and second part 190 and after first part 180 and second part 190 are adjusted into the final position (T1 in FIG. 5G is greater than T2 in FIG. 5H). On the other hand, the width of uncured sealant layer 110 prior to being contacted by both first part 180 and second part 190 is less than after uncured sealant layer 110 is in contact with both first part 180 and second part 190 and after first part 180 and second part 190 are adjusted into the final position (W1 in FIG. 5G is smaller than W2 in FIG. 5H). The volume of uncured sealant layer 110 remains the same, but the thickness and width (or, more generally, the contact area) of uncured sealant layer 110 increases while adjusting the position of first part 180 relative to second part 190.

In some examples, uncured sealant layer 110 does not extend past the faying surfaces of first part 180 and second part 190 as, e.g., is schematically shown in FIG. 5H. This feature eliminates the need to clean the excess of uncured sealant layer 110 thereby reducing material waste and labor. This feature is achieved by controlling the volume and shape of uncured sealant layer 110 and the final position of first part 180 and second part 190.

Figure 5I:
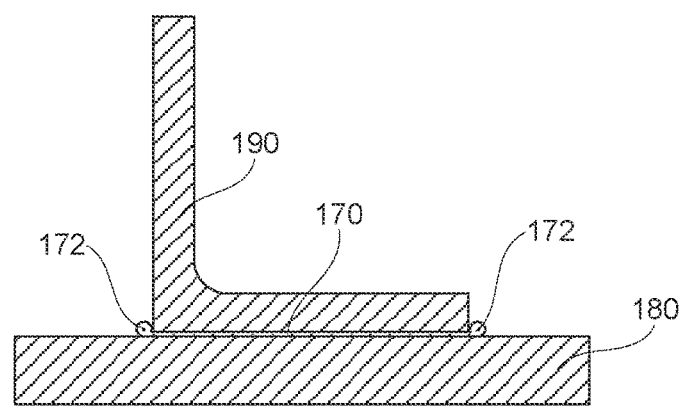
FIG. 5I is a schematic illustration of another example of two parts with an uncured sealant layer between these parts.

Referring to FIG. 5I, in alternative examples, the volume of uncured sealant layer 110 is specifically selected such that a controlled portion of uncured sealant layer 110 extends beyond the faying surfaces of first part 180 and second part 190 while forming seal 170. This controlled portion of uncured sealant layer 110, after curing, forms fillet 172 of seal 170 as, e.g., is schematically shown in FIG. 5I. In these examples, fillet 172 is used to provide additional sealing and/or bonding. It should be noted that there is no excess of uncured sealant layer 110 in these examples. The amount of uncured sealant layer 110, which is squeezed out from the gap between first part 180 and second part 190 is specifically controlled. For example, the size of fillet 172 is determined by the volume and shape of uncured sealant layer 110 and the final position of first part 180 and second part 190.

In some examples, uncured sealant layer 110 is then cured into seal 170 in ambient conditions and at a curing temperature between 15° and 80° C. In some examples, the curing is performed at least in part at room temperature of between 20° C. and 25° C. Alternatively, uncured sealant layer 110 is cured by, for example, (block 270) heating the entire assembly comprising uncured sealant layer 110, first part 180, and second part 190. The temperature and the curing duration depend on the formulation of uncured sealant layer 110 as described above.

In some examples, removing first protective layer 120, contacting first part 180 with first sealant surface 111, removing second protective layer 130 from uncured sealant layer 110, and contacting second part 190 with second sealant surface 112 are performed within a set period, less than a pot life of uncured sealant layer 110.

Examples of Forming Uncured Sealant Assemblies

Figure 6:
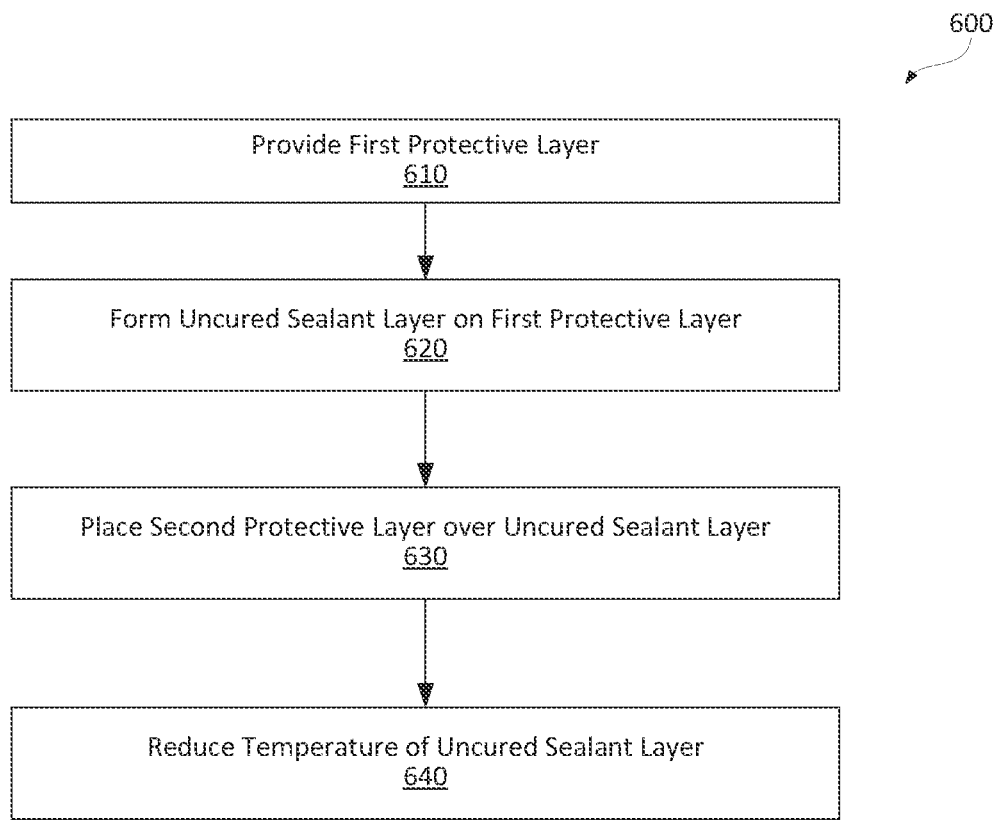
FIG. 6 is a process flowchart corresponding to a method of forming an uncured sealant assembly, in accordance with some examples.

FIG. 6 is a process flowchart corresponding to method 600 of forming uncured sealant assembly 100, in accordance with some examples. Various examples of uncured sealant assembly 100 are described above with reference to FIG. 1 and other figures.

Figure 7A:
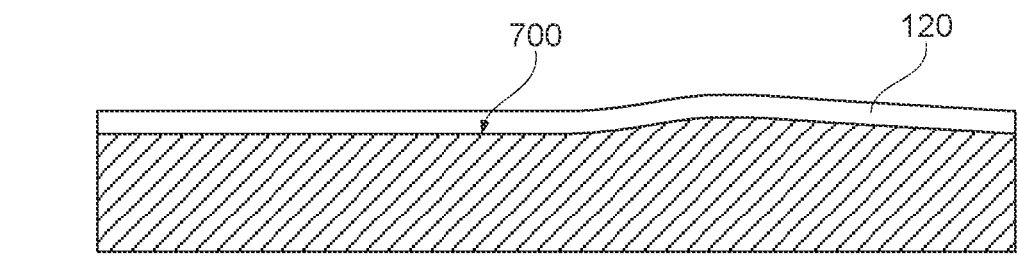
FIGS. 7A-7D are schematic illustrations of different stages on the method in FIG. 6.

Method 600 comprises (block 610) providing first protective layer 120. Various examples of first protective layer 120 are described above. In some examples, first protective layer 120 is positioned and conforms to support surface 700 as, e.g., is schematically shown in FIG. 7A. For example, support surface 700 is shaped based on the desired thickness profile of uncured sealant layer 110, which is later formed on first protective layer 120. In some examples, support surface 700 is non-planar, which results in first protective layer 120 also being non-planar as, e.g., is schematically shown in FIG. 7A.

Figure 7B:
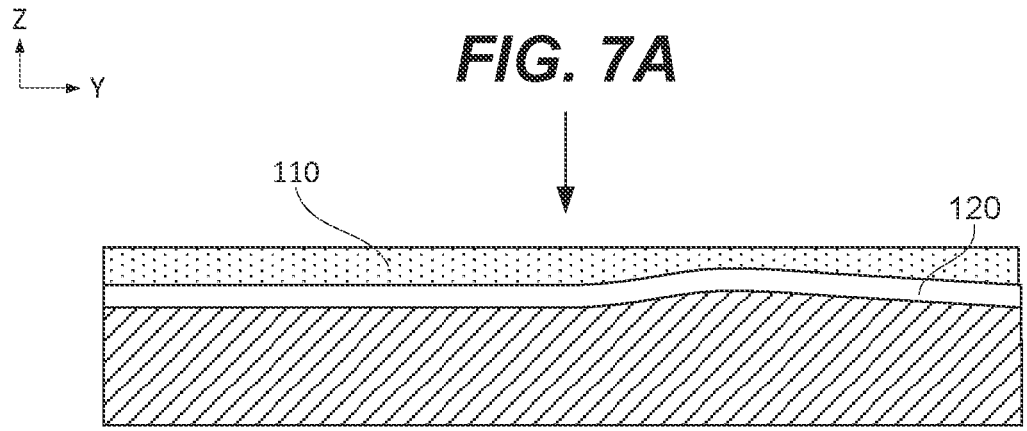

Method 600 proceeds with (block 620) forming uncured sealant layer 110 over first protective layer 120. For example, uncured sealant layer 110 is formed using a pultrusion technique or a two-die casting. However, other forming techniques are also within the scope. In some examples, the exposed surface of uncured sealant layer 110, formed in this operation is substantially planar. Combining this feature with first protective layer 120 being non-planar results in uncured sealant layer 110 having a variable thickness as, e.g., is schematically shown in FIG. 7B.

In some examples, support surface 700 is used to support first protective layer 120 during this uncured sealant layer forming operation. In more specific examples, support surface 700 is used to remove heat from first protective layer 120 and from uncured sealant layer 110 as uncured sealant layer 110 is being formed. This cooling feature allows extending the shelf-life of uncured sealant layer 110.

Figure 7C:
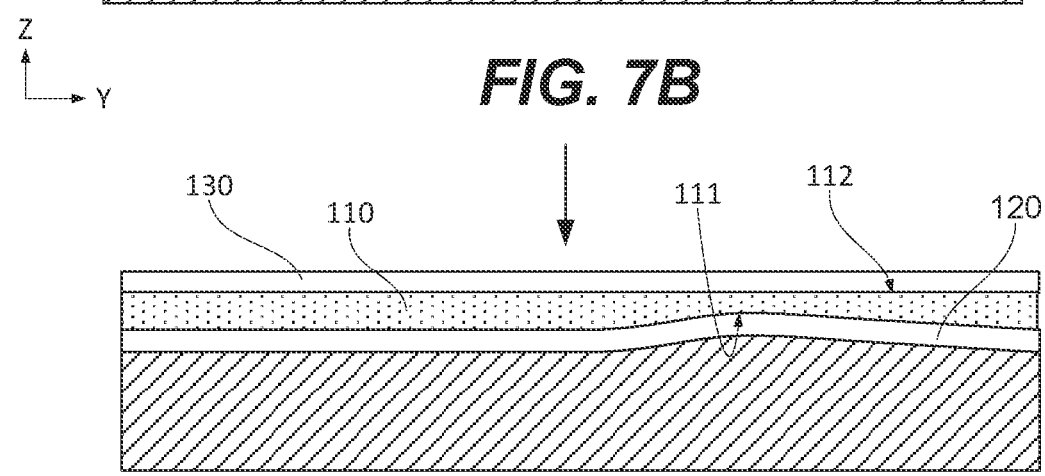
Figure 7D:
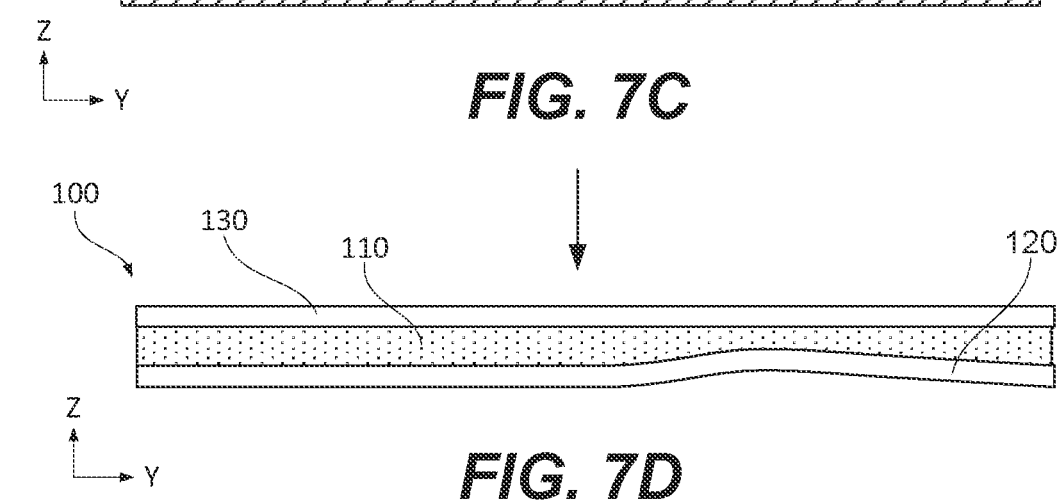

Method 600 proceeds with (block 630) placing second protective layer 130 over uncured sealant layer 110. After this operation, uncured sealant layer 110 is disposed between first protective layer 120 and second protective layer 130 as, e.g., is schematically shown in FIG. 7C. At this stage, both first sealant surface 111 and second sealant surface 112 uncured sealant layer 110 are protected and the resulting uncured sealant assembly 100 can be handled and stored. For example, uncured sealant assembly 100 can be removed from support surface 700 and placed, e.g., in a cold storage.

In some examples, method 600 proceeds with (block 640) reducing the temperature of at least uncured sealant layer 110 to or below the cure-inhibiting temperature. Various examples of the cure-inhibiting temperature are described above. In some examples, the temperature of uncured sealant layer 110 is reduced while uncured sealant layer 110 is being formed or soon thereafter to extend the shelf-life of uncured sealant assembly 100. For example, forming uncured sealant layer 110 and reducing the temperature of at least uncured sealant layer 110 at least partially overlap in time.

Aircraft Examples

In some examples, methods, and systems described above are used on aircraft and, more generally, by the aerospace industry. Specifically, these methods and systems can be used during the fabrication of aircraft as well as during aircraft service and maintenance.

Figure 8:
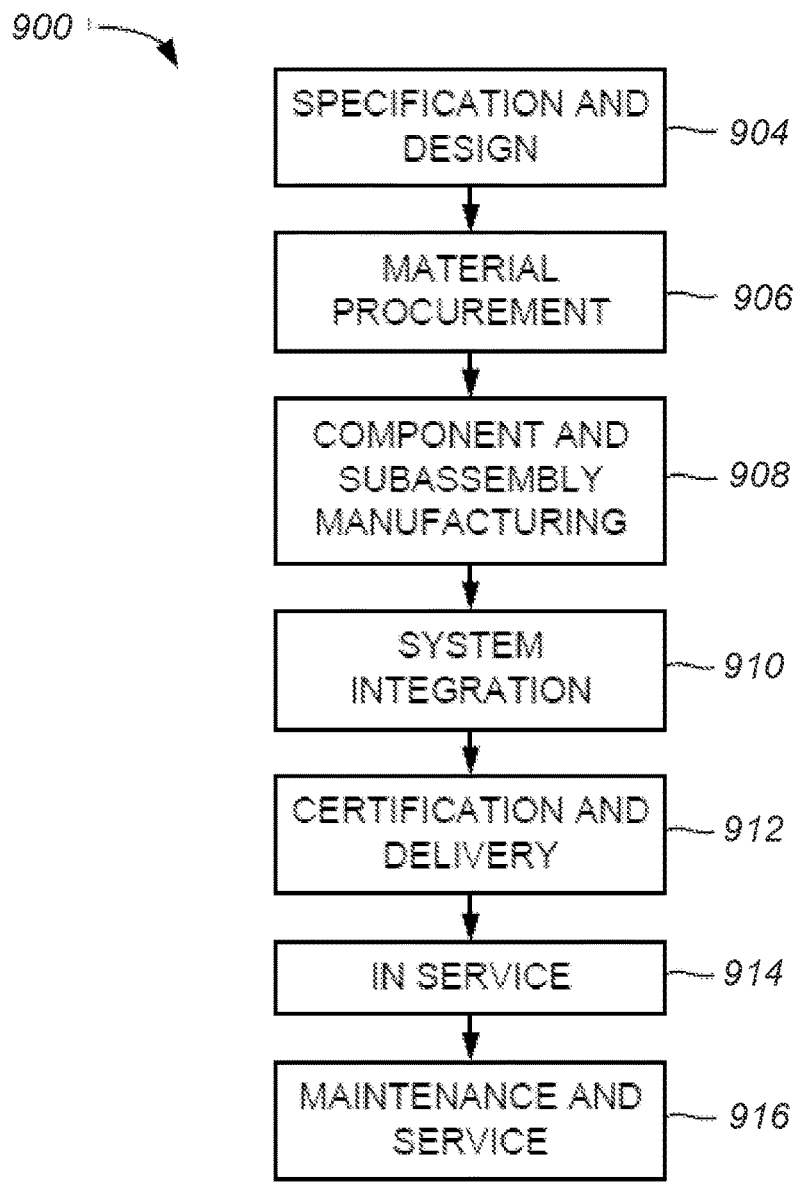
FIG. 8 is a process flowchart corresponding to a method for manufacturing and servicing the aircraft.
Figure 9:
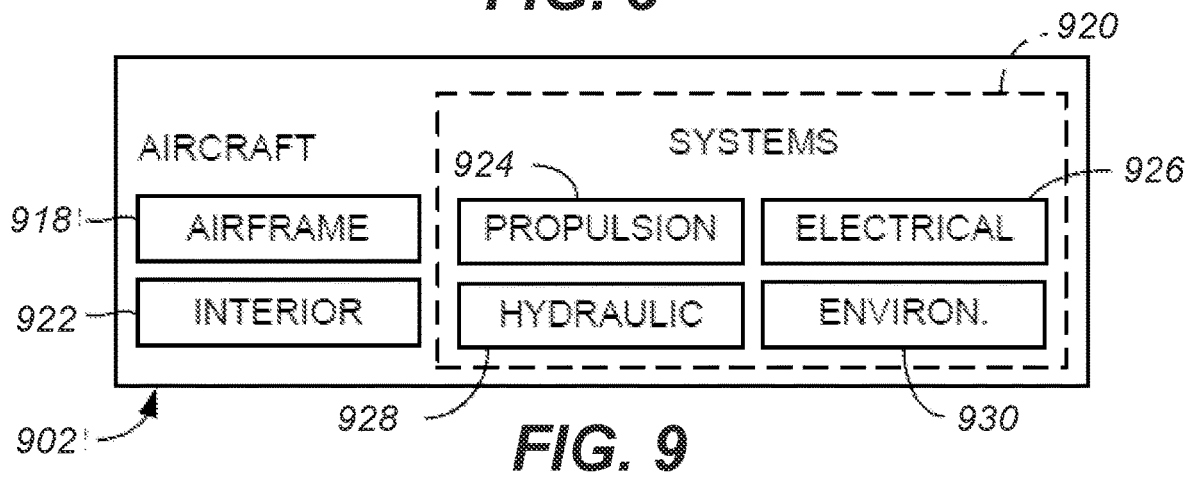
FIG. 9 illustrates a block diagram of an example aircraft, in accordance with some examples.

Accordingly, the apparatus and methods described above are applicable for aircraft manufacturing and service method 900 as shown in FIG. 8 and for aircraft 902 as shown in FIG. 9. During pre-production, method 900 includes specification and design 904 of aircraft 902 and material procurement 906. During production, component, and subassembly manufacturing 908 and system integration 910 of aircraft 902 takes place. Thereafter, aircraft 902 goes through certification and delivery 912 to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For this description, a system integrator includes without limitation any number of aircraft manufacturers and major-system subcontractors; a third party includes without limitation any number of vendors, subcontractors, and suppliers; and an operator can be an airline, leasing company, military entity, service organization, and so on.

As shown in FIG. 9, aircraft 902 produced by method 900 includes airframe 918 with plurality of systems 920 and interior 922. The airframe 918 includes the wings of aircraft 902. Examples of systems 920 include one or more of propulsion system 924, electrical system 926, hydraulic system 928, and environmental system 930. Any number of other systems can be included.

Apparatus and methods presented herein can be employed during any one or more of the stages of method 900. For example, components or subassemblies corresponding to manufacturing 908 are fabricated or manufactured like components or subassemblies produced while aircraft 902 is in service. Also, one or more apparatus examples, method examples, or a combination thereof are utilized during manufacturing 908 and system integration 910, for example, by substantially expediting assembly of or reducing the cost of an aircraft 902. Similarly, one or more apparatus examples, method examples, or a combination thereof are utilized while aircraft 902 is in service, for example, and without limitation, to maintenance and service 916.

FURTHER EXAMPLES

Further, the description includes examples according to the following clauses:

Clause 1. A method of forming a seal between a first part and a second part using an uncured sealant assembly, the method comprising:
removing the uncured sealant assembly from a cure-inhibiting temperature,
wherein the uncured sealant assembly comprises a first protective layer, a second protective layer, and an uncured sealant layer disposed between the first protective layer and the second protective layer,
wherein the cure-inhibiting temperature is below room temperature and selected to reduce a curing rate of the uncured sealant layer;
removing the first protective layer from the uncured sealant layer thereby exposing a first sealant surface of the uncured sealant layer;
contacting the first part with the first sealant surface;
removing the second protective layer from the uncured sealant layer thereby exposing a second sealant surface of the uncured sealant layer, the second sealant surface being opposite to the first sealant surface; and
contacting the second part with the second sealant surface such that the uncured sealant layer is disposed between the first part and the second part, wherein the uncured sealant layer is cured into the seal.

Clause 2. The method of clause 1, wherein, before contacting the first part with the first sealant surface, the uncured sealant layer has a thickness, a length, and a width, such that the thickness of the uncured sealant layer varies at least along the length of the uncured sealant layer.

Clause 3. The method of any one of clauses 1 or 2, wherein, before contacting the first part with the first sealant surface, the uncured sealant layer has a thickness, a length, and a width, such that the thickness the uncured sealant layer varies at least along the width the uncured sealant layer.

Clause 4. The method of any one of clauses 1-3, wherein, before contacting the first part with the first sealant surface, the uncured sealant layer has a thickness, a length, and a width, such that the thickness of the uncured sealant layer varies along both the width and the length of the uncured sealant layer.

Clause 5. The method of any one of clauses 1-4, wherein the uncured sealant layer has a thickness, a length, and a width selected based on the shape of a first-part sealed surface of the first part, contacting the first sealant surface and also based on the shape of a second-part sealed surface of the second part, contacting the second sealant surface.

Clause 6. The method of clause 5, wherein at least one of the first-part sealed surface or the second-part sealed surface is non-planar.

Clause 7. The method of clause 5, wherein at least the thickness and the width of the uncured sealant layer are selected such the seal fully occupies a gap between the first-part sealed surface or the second-part sealed surface without extending outside the gap between the first-part sealed surface or the second-part sealed surface.

Clause 8. The method of any one of clauses 1-7, further comprising, after contacting the second part with the second sealant surface and before the uncured sealant layer is cured into the seal, adjusting the position of the first part relative to the second part thereby distributing the uncured sealant layer within space between the first part and the second part.

Clause 9. The method of any one of clauses 1-8, further comprising, before removing the first protective layer from the uncured sealant layer, cutting the uncured sealant assembly along a length of the uncured sealant assembly thereby adjusting a width of the uncured sealant assembly.

Clause 10. The method of any one of clauses 1-9, wherein the cure-inhibiting temperature is less than 4° C.

Clause 11. The method of any one of clauses 1-10, wherein the uncured sealant layer is cured into the seal at a room temperature of between 15° C. and 25° C.

Clause 12. The method of any one of clauses 1-11, wherein removing the first protective layer, contacting the first part with the first sealant surface, removing the second protective layer from the uncured sealant layer, and contacting the second part with the second sealant surface are performed within a set time period, being less than a pot life of the uncured sealant layer.

Clause 13. The method of any one of clauses 1-12, wherein the uncured sealant layer comprises a two-component sealant selected from the group consisting of a polysulfide sealant, a silicone sealant, a polythioether sealant, and combinations thereof.

Clause 14. The method of any one of clauses 1-13, wherein the first protective layer and the second protective layer comprises one or more materials selected from the group consisting of polytetrafluoroethylene (PTFE) and fluorinated ethylene propylene (FEP), silicone, and combinations thereof.

Clause 15. The method of any one of clauses 1-14, wherein the seal is one of a fluid seal of an airplane fuselage aft pressure bulkhead to a fuselage skin, a fluid seal of an airplane fuselage aft wheel well bulkhead to a fuselage skin, a fluid seal of airplane wing ribs to a wing skin to form a wing fuel tank, a fluid seal of airplane wing spars to a wing skin to form a wing fuel tank, a corrosion protection of an aircraft fuselage frame components to a fuselage skin, a corrosion protection of aircraft fuselage longerons or stringers to a fuselage skin, a corrosion protection of aircraft brackets to primary structural elements, or a corrosion protection of an aircraft component to a primary structural elements.

Clause 16. A method of forming an uncured sealant assembly, the method comprising:
   providing a first protective layer;
   forming an uncured sealant layer on the first protective layer;
   placing a second protective layer over the uncured sealant layer such that the uncured sealant layer is disposed between the first protective layer and the second protective layer; and
   reducing the temperature of at least the uncured sealant layer to or below a cure-inhibiting temperature, which is below a room temperature and which is selected to inhibit curing of the uncured sealant layer.

Clause 17. The method of clause 16, wherein forming the uncured sealant layer comprises a putrusion or a two-die casting.

Clause 18. The method of any one of clauses 16-17, wherein forming the uncured sealant layer, placing the second protective layer, and reducing the temperature of at least the uncured sealant layer at least partially overlap in time.

Clause 19. The method of any one of clauses 16-18, wherein the first protective layer is provided conformal to a support surface, the support surface being non-planar.

Clause 20. The method of any one of clauses 16-19, wherein, after forming the uncured sealant layer and before placing the second protective layer over the uncured sealant layer, the uncured sealant layer has a thickness, a length, and a width, such that the thickness of the uncured sealant layer varies at least along the length of the uncured sealant layer.

Clause 21. The method of any one of clauses 16-20, wherein, after forming the uncured sealant layer and before placing the second protective layer over the uncured sealant layer, the uncured sealant layer has a thickness, a length, and a width, such that the thickness of the uncured sealant layer varies at least along the width of the uncured sealant layer.

CONCLUSION

Although the foregoing concepts have been described in some detail for purposes of clarity of understanding, it will be apparent that certain changes and modifications may be practiced within the scope of the appended clauses. It should be noted that there are many alternative ways of implementing the processes, systems, and apparatus. Accordingly, the present examples are to be considered as illustrative and not restrictive.

What is claimed is:

1. A method of forming a seal between a first part and a second part using an uncured sealant assembly, the method comprising:
   removing the uncured sealant assembly from a cure-inhibiting temperature,
      wherein the uncured sealant assembly comprises a first protective layer, a second protective layer, and an uncured sealant layer disposed between the first protective layer and the second protective layer,
      wherein the cure-inhibiting temperature is below room temperature and selected to reduce a curing rate of the uncured sealant layer;
   removing the first protective layer from the uncured sealant layer thereby exposing a first sealant surface of the uncured sealant layer;
   contacting the first part with the first sealant surface;
   removing the second protective layer from the uncured sealant layer thereby exposing a second sealant surface of the uncured sealant layer, the second sealant surface being opposite to the first sealant surface; and
   contacting the second part with the second sealant surface such that the uncured sealant layer is disposed between the first part and the second part, wherein the uncured sealant layer is cured into the seal,
   further wherein, before contacting the first part with the first sealant surface and before contacting the second part with the second sealant surface, the uncured sealant layer has a thickness, a length, and a width selected based on the shape of a first-part sealed surface of the first part contacting the first sealant surface and also based on the shape of a second-part sealed surface of the second part contacting the second sealant surface, such that no empty space is present between the first part and the second part after contacting the first part with the first sealant surface and without adjusting the first part relative to the second part, and after contacting the second part with the second sealant surface and without adjusting the first part relative to the second part, wherein at least one of the first-part sealed surface and the second-part sealed surface is nonplanar.

2. The method of claim 1, wherein, before contacting the first part with the first sealant surface, the uncured sealant layer has a thickness, a length, and a width, such that the thickness of the uncured sealant layer varies at least along the length of the uncured sealant layer.

3. The method of claim 1, wherein, before contacting the first part with the first sealant surface, the uncured sealant layer has a thickness, a length, and a width, such that the thickness the uncured sealant layer varies at least along the width the uncured sealant layer.

4. The method of claim 1, wherein, before contacting the first part with the first sealant surface, the uncured sealant layer has a thickness, a length, and a width, such that the thickness of the uncured sealant layer varies along both the width and the length of the uncured sealant layer.

5. The method of claim 1, further comprising, before removing the first protective layer from the uncured sealant layer, cutting the uncured sealant assembly along a length of the uncured sealant assembly thereby adjusting a width of the uncured sealant assembly.

6. The method of claim 1, wherein the cure-inhibiting temperature is less than 4° C.

7. The method of claim 1, wherein the uncured sealant layer is cured into the seal at a room temperature of between 15° C. and 25° C.

8. The method of claim 1, wherein removing the first protective layer, contacting the first part with the first sealant surface, removing the second protective layer from the uncured sealant layer, and contacting the second part with the second sealant surface are performed within a set time period, being less than a pot life of the uncured sealant layer.

9. The method of claim 1, wherein the uncured sealant layer comprises a two-component sealant selected from the group consisting of a polysulfide sealant, a silicone sealant, a polythioether sealant, and combinations thereof.

10. The method of claim 1, wherein the first protective layer and the second protective layer comprises one or more materials selected from the group consisting of polytetrafluoroethylene (PTFE) and fluorinated ethylene propylene (FEP), silicone, and combinations thereof.

11. The method of claim 1, wherein the seal is one of a fluid seal of an airplane fuselage aft pressure bulkhead to a fuselage skin, a fluid seal of an airplane fuselage aft wheel well bulkhead to a fuselage skin, a fluid seal of airplane wing ribs to a wing skin to form a wing fuel tank, a fluid seal of airplane wing spars to a wing skin to form a wing fuel tank, a corrosion protection of an aircraft fuselage frame components to a fuselage skin, a corrosion protection of aircraft fuselage longerons or stringers to a fuselage skin, a corrosion protection of aircraft brackets to primary structural elements, or a corrosion protection of an aircraft component to a primary structural elements.

* * * * *